(12) United States Patent
Thakrar et al.

(10) Patent No.: US 6,284,161 B1
(45) Date of Patent: Sep. 4, 2001

(54) COLORED CONTACT LENSES AND METHOD OF MAKING SAME

(75) Inventors: Ashok R. Thakrar, Phoenix, AZ (US); Bradley K. Overmyer, Columbus, OH (US)

(73) Assignee: PBH, Inc., Des Plaines, IL (US)

( * ) Notice: Subject to any disclaimer, the term of this patent is extended or adjusted under 35 U.S.C. 154(b) by 0 days.

(21) Appl. No.: 08/143,373

(22) Filed: Oct. 26, 1993

Related U.S. Application Data

(63) Continuation of application No. 07/898,435, filed on Jun. 15, 1992, now abandoned, which is a continuation of application No. 07/746,770, filed on Aug. 16, 1991, now abandoned, which is a division of application No. 07/469,007, filed on Jan. 29, 1990, now abandoned, which is a continuation-in-part of application No. 07/310,942, filed on Feb. 16, 1989, now abandoned.

(51) Int. Cl.$^7$ ...................................................... B29D 11/00
(52) U.S. Cl. ............................................. 264/1.7; 264/2.6
(58) Field of Search .............................. 264/1.7, 1.1, 2.6

(56) References Cited

U.S. PATENT DOCUMENTS

| | | |
|---|---|---|
| 3,408,429 | 10/1968 | Wichterle . |
| 3,496,254 | 2/1970 | Wichterle . |
| 3,557,261 | 1/1971 | Wichterle . |
| 3,660,545 | 5/1972 | Wichterle . |
| 3,679,504 | 7/1972 | Wichterle ................................ 156/62 |
| 3,691,263 | 9/1972 | Vladimir et al. . |
| 3,699,089 | 10/1972 | Wichterle . |
| 3,822,089 | 7/1974 | Wichterle . |
| 3,941,858 | 3/1976 | Shepherd et al. . |
| 4,252,421 | 2/1981 | Foley, Jr. .............................. 351/162 |
| 4,303,701 | 12/1981 | Torgersen et al. ................... 427/145 |
| 4,416,837 | 11/1983 | Neefe . |
| 4,422,984 | 12/1983 | Neefe . |
| 4,424,175 | 1/1984 | Neefe . |
| 4,465,794 | 8/1984 | Kuzma ................................. 523/106 |
| 4,517,140 | 5/1985 | Rawlings . |
| 4,534,916 | 8/1985 | Wichterle . |
| 4,541,969 | 9/1985 | Neefe . |
| 4,582,402 | 4/1986 | Knapp ................................... 351/162 |
| 4,590,018 | 5/1986 | Neefe . |
| 4,592,752 | 6/1986 | Neefe ................................... 604/895 |
| 4,625,009 | 11/1986 | Izumitani et al. . |
| 4,626,388 | 12/1986 | Wichterle . |
| 4,640,805 | 2/1987 | Neefe ................................... 265/1.1 |
| 4,668,240 | 5/1987 | Loshaek ................................. 8/507 |
| 4,680,149 | 7/1987 | Rawlings . |
| 4,704,017 | 11/1987 | Knapp ................................... 351/177 |
| 4,719,657 | 1/1988 | Bawa ....................................... 8/453 |
| 4,720,188 | 1/1988 | Knapp . |
| 5,034,166 * | 7/1991 | Rawlings et al. ...................... 264/1.7 |
| 5,039,459 | 8/1991 | Kindt-Larsen et al. . |
| 5,066,431 | 11/1991 | Briggs et al. . |
| 5,080,839 | 1/1992 | Kindt-Larsen . |
| 5,094,609 | 3/1992 | Kindt-Larsen . |
| 5,143,660 | 9/1992 | Hamilton et al. . |
| 5,260,001 | 11/1993 | Nandu et al. . |

FOREIGN PATENT DOCUMENTS

| | | |
|---|---|---|
| 3023964 | 1/1982 | (DE) . |
| 0122771 | 10/1984 | (EP) . |
| 0262832 | 4/1988 | (EP) . |
| WO8302777 | 8/1983 | (WO) . |

OTHER PUBLICATIONS

Lai, Yu–Chin, "Contact Lenses", Encyclopedia of Chemical Technology, Forth Edition, 7:192–218.

Refojo, Miguel F., "Contact Lenses", Encyclopedia of Chemical Technology, Third Edition, 6:720–742.

Singer, Helmut K., et al., "Contact Lenses", Encyclopedia of Polymer Scient and Engineering, 4:164–173.

* cited by examiner

*Primary Examiner*—Mathieu D. Vargot
(74) *Attorney, Agent, or Firm*—Burns, Doane, Swecker & Mathis, L.L.P.

(57) ABSTRACT

Optical lenses and methods of preparing the same, in which an active material encapsulated in resin capsules is impregnated in said lens, adjacent an optical surface thereof. The active material may be a coloring material for producing a printed color pattern in the iris or other areas of the lens, or it may be a therapeutic agent.

10 Claims, No Drawings

COLORED CONTACT LENSES AND METHOD OF MAKING SAME

This application is a continuation, of application Ser. No. 07/898,435, filed Jun. 15, 1992, now abandoned, which, in turn, is a continuation of application Ser. No. 07/746,770, filed Aug. 16, 1991, now abandoned, which is a division of Ser. No. 07/469,007, filed Jan. 29, 1990, now abandoned, which is a Continuation in Part of Ser. No. 07/310,942, filed Feb. 16, 1989, abandoned.

FIELD OF THE INVENTION

This invention relates to contact lenses having a color pattern simulating the natural color structure of the human iris. The invention also relates to methods of producing such lenses.

BACKGROUND AND PRIOR ART

It is often desired that contact lenses be colored or tinted for various purposes. The tinting may be useful for identification purposes and also to protect the user from bright light. Lenses may also be tinted for cosmetic purposes, not only to enhance the natural coloring of the eyes, but sometimes to conceal disfigurements.

The coloring of materials of this nature has been a demanding assignment. The colorants must be incorporated without interfering with the optical properties of the final product. They must resist leaching out on storage and auto-claving, and must not undergo decomposition in the presence of reagents used in daily cleaning and sterilization of the lens material. They must not fade upon prolonged exposure to light, and they must be non-toxic and physiologically inert, as well as mechanically non-irritating. From a commercial standpoint, it is necessary that the colorants be applied in a process which is not so complex or time-consuming or labor intensive as to be impractical.

A special problem arises from the fact that the natural appearance of the human iris is not a simple solid color, but consists of a patterned structure involving many shapes and colors. Therefore, colored lenses having merely a solid color in the iris area have the disadvantage of producing an unnatural appearance when fitted in the eye.

U.S. Pat. No. 4,640,805 discloses a method in which color is applied to the lens during the manufacturing process, and spin casting techniques are used for accurately limiting the application of colorant to the iris area. However, the coloring material is dissolved into the monomer material as a solid color, without any attempt to match the natural color pattern of the human iris. U.S. Pat. No. 4,252,431 discloses a method of ensuring color only in the iris area and not in the white periphery, by separately preparing and assembling a tinted central core and a clear outer lens element. However, here again, the tinted central core is provided with a solid color, without the simulation of the natural iris pattern.

In U.S. Pat. No. 4,582,402 and No. 4,704,017, water-insoluble opaque pigment particles are deposited on the lens surface in the iris area, in a pattern designed to simulate the natural structure of the iris, using offset pad printing techniques. However, in the process disclosed in these patents, the lens must first be produced, and then, in an added manufacturing segment, the pigment pattern is prepared and transferred to the surface of the previously prepared lens. Following this, the lens is subjected to further treatment to fix the pigment to the surface of the lens and render it resistant to leaching, abrasion, fading, and the like. U.S. Pat. No. 4,668,240 also discloses a process in which a coloring substance and a binding agent are printed in an iris pattern on the surface of a contact lens. Here again, however, the lens must be first produced, and the printing is accomplished in a series of additional steps in a later manufacturing segment.

It is an object of the present invention to provide a process in which a single- or multi-colored pattern is printed and fixed in the lens during the actual manufacture of the lens itself, thus enabling significant reductions in manufacturing time as well as costs of labor and materials.

It is another object of the invention to provide an optical lens in which the printed pattern becomes a part of, and is protected by the lens matrix, adjacent the surface of the lens.

It is a further object of the invention to provide an optical lens in which the printed pattern exhibits superior resistance to ocular fluids, bleaches, hydrogen peroxide, boiling water and other chemicals, such as alcohol, acetone and freon, which come in contact with the lens during manufacturing finishing steps or daily maintenance of the lens.

A still further object of the invention is to provide an optical lens in which an active material other than a coloring material (e.g., a therapeutic agent) is fixed in the lens during the actual manufacture of the lens itself, using the special procedures disclosed hereinafter.

Other objects and advantages will be apparent from the following description and examples.

SUMMARY OF THE INVENTION

This invention is based on the surprising discovery that a highly effective colored printed pattern, such as an iris pattern, can be applied to an optical lens in the course of producing the lens itself. It has been found that, by using a specially prepared color dispersion to imprint a pattern on one or both surfaces of the lens casting mold and then proceeding with the usual steps of filling the mold with monomer, polymerizing, and finishing, it is possible to produce an optical lens having a high quality pattern embedded in the lens matrix adjacent its surface. Applying the pattern in this manner not only improves the preciseness and reproducibility of the manufacturing process but also enhances the quality of the end product. Further, applying the printed pattern to the casting mold permits the coloring step to be incorporated as an integral part of the manufacturing process, rather than reserving it as a separate, subsequent manufacturing operation. The discovery therefore significantly reduces repetitive handling of the plastic lens materials and enables efficient automation of the complete operation. The coloring agents which have been found useful in the foregoing are insoluble pigments or dyes which are dispersed in a resin system.

The invention therefore may be described in general terms as a method of producing a colored contact lens comprising the steps of selecting a coloring material which is insoluble in the monomer material to be used in the lens, dispersing the coloring material in a resin system which is compatible with the monomer material, using the resulting dispersion to imprint a pattern on one or more surfaces of a casting mold, introducing a monomeric lens forming liquid in said mold in contact with the imprinted surface or surfaces, and polymerizing the liquid to produce a lens blank having a colored pattern impregnated in said blank, adjacent one or both optical surfaces thereof.

A preferred embodiment of the invention is a method of producing a colored soft contact lens comprising the steps of providing a resin system by dissolving from about 10 to 30% by weight of a thermoplastic resin, such as polyvinyl alcohol, in about 90 to 70% by weight of a solvent, such as butanol; dispersing in the resulting solution from about 1 to 80% by weight of insoluble pigments, such as phthalocyanine blue, phthalocyanine green, titanium dioxide, iron oxides, or mixtures thereof; using the resulting dispersion to imprint an iris pattern on one or both surfaces of a casting mold; introducing a hydrogel-producing monomer, such as hydroxy ethyl methacrylate monomer, in the mold in contact with the imprinted mold surface or surfaces; and polymerizing the monomer to produce a lens blank having a colored iris pattern impregnated in the blank, adjacent one or both optical surfaces thereof.

Another embodiment of the invention comprises marking both sides of a lens blank with matching white and colored dots or rings, such that the white dot blends with the white sclera on the outer convex side of the lens, while the colored dot or indicia shows on the inner or concave side of the lens, to assist the wearer in determining whether the flexible lens has turned inside out (i.e., whether the lens has the proper vertiness).

The invention also comprises a new product—namely, an optical lens having an active material encapsulated in resin capsules impregnated in the lens, adjacent one or both optical surfaces thereof. For the purposes of this specification, the term "active material" includes (1) insoluble materials that provide color in the lens or a means of controlling radiation, such as UV radiation or (2) soluble therapeutic agents.

DETAILED DESCRIPTION OF THE INVENTION

In the practice of the invention, the procedure is initiated by dissolving a resin in a solvent and then dispersing an insoluble pigment or dye in the resulting solution to produce a special coloring liquid, or ink, which may be used to print a pattern on the casting mold surface.

The resin may be any plastic material which is compatible with the monomer which is to be used to form the lens. It must be compatible with the monomer in the sense that it will not cause haziness, precipitation or agglomerization when it comes in contact with the lens material, or cause warping of the lens, or otherwise have an adverse impact on the optical integrity of the lens. Of course, it is also essential that the resin be non-toxic and non-irritating.

Resins suitable for use in the invention include thermoplastic materials. Materials of this type which have been found especially useful are polyvinyl alcohol and polymethylmethacrylate. Other suitable materials include polyvinylpyrrolidone, polyvinylchloride, cellulosic resins, thermoplastic polyesters, polyhydroxyethyl methacrylate, polydimethylacrylamide, and the like. Thermosetting resins in the precursor stage prior to crosslinking or setting may also be employed. For example, unsaturated polyesters may be used prior to the time they are crosslinked with styrene to form the thermoset product. Naturally occurring resins may also be used.

Any suitable solvent may be used for bringing the resin material into solution. Depending on the solubility characteristics of the resin, solvents such as alcohol, methylethylketone, acetone, cyclohexanone, and Cellosolve Acetate (2-ethoxyethyl acetate) are useful in the procedure.

The concentration of the resin in the solvent is not critical. Generally, the objective is to prepare a solution having a viscosity sufficiently low to disperse the coloring materials and other additives to be incorporated in the ink. Usually, a concentration of about 1 to 90% by weight of the resin in the solvent will be suitable. A preferred concentration is in the range of 1 to 35%. The most preferred is in the range of 1 to 10%.

The solution prepared as above is then mixed with the coloring material to prepare a suitable dispersion. The coloring material may be any colorant which is insoluble in the monomer to be used to form the lens. Preferred colorants include phthalocyanine blue, phthalocyanine green, chromic-alumina-cobaltous oxide, chromium oxides, and various iron oxides for red, yellow, brown and black colors. Opaquing agents such as titanium dioxide may also be included. For most applications, it is desirable to employ a mixture of colors, for better simulation of natural iris appearance. Although pigments are the preferred form of colorant, it is also possible to use dyes which are insoluble in the monomer lens material and which can be dispersed in the polymerized resin.

The concentration of the colorant added to the resin solution is governed by the intensity and type of the colorant. The objective is to add sufficient pigment or dye to give optimum hiding power when applied in a printing film thickness of about 10 to 40 microns. Generally, the colorant may be added in concentrations of about 1 to 80% by weight of the resin solution.

The dispersion of the colorant in the resin solution is achieved by conventional means, such as vigorously mixing in a high speed blender or milling in a roll or ball mill or by use of an ultrasonic probe. The milling and dispersion are continued until the mixture is uniform and the size of the particles has been reduced to 10 microns or below. The addition of ingredients and the dispersing techniques are carried out with the objective of preparing a printing ink with suitable viscosity for use in the subsequent offset printing operation. If necessary, conventional thixotropic agents can be added at this stage to provide the necessary sag resistance, or otherwise impart a thixotropic index sufficiently high to prevent running of the ink when subsequently applied to the surface of the casting mold.

As the next step, the above printing dispersion is used to imprint a pattern (such as that of the iris) on one or both surfaces of the casting mold which is to be used for producing the lens. The pattern is created by etching on a steel plate using well known etching techniques, and then a commercially available pad transfer printing machine is used to apply the pattern to the mold surface. The pattern on the steel plate may be generated by computer design and consists of an arrangement of etched impressions, in which the intensity of the finished color may be controlled by the frequency and depth of the impressions. The etching is accomplished by applying to the steel plate a solution of material which insolubilizes when exposed to light; covering the plate with the pattern matrix; exposing the plate to light to insolubilize the areas not covered by the pattern; washing away the soluble areas; and then etching the remaining areas to the desired depths.

In the operation of the pad transfer printing machine, a doctor blade smears the ink on the steel plate, and then a silicone pad is applied to pick up the ink pattern and transfer it to the casting mold surface. In the preferred embodiment, the pattern is applied to the convex mold component, although it is possible also to apply it to the concave component, or to both. If the lens is being prepared by a technique in which only one optical surface is produced in a casting mold, and the other surface prepared by lathing, the objectives of the present invention can be accomplished by applying the pattern to the single surface utilized in the casting mold. If desired, the printing procedure may be repeated using different colors or different patterns, to achieve the desired color or intensity. It is understood that the pattern may also be applied to the mold surface by other printing techniques, such as jet spray, silk screen or laser printing including liquid crystal shutters.

When the pattern has been imprinted on the casting mold surface or surfaces, as above, the solvent in the ink may be allowed to evaporate, leaving on the mold surface a deposition in which the insoluble colorant particles are encapsulated in the resin. The monomer to be used to form the lens is then poured into the mold, together with suitable conventional curing catalysts. It is a surprising feature of the present invention that, when the monomer is thus introduced, it causes a mechanical altering and softening of the surface of the individual resin/colorant capsules, which allows the monomer to penetrate the interstices between the capsules and surround them, so that the capsules become impregnated in the monomer matrix with the pattern remaining intact. As an extension of this phenomenon, a thin layer of monomer interposes itself between the resin/colorant capsules and the casting mold surface, so that when the finished lens is subsequently removed from the mold, the surface is a substantially intact layer of lens forming material, with the printed pattern of resin/colorant capsules located beneath said surface, but closely adjacent thereto.

The monomer casting liquid which is poured into the mold as above may be any of the conventional monomers or mixtures thereof which are known in the art for the production of plastic contact lenses. For example, in the area of soft contact lenses, the hydroxyethylmethacrylate and ethylene glycol dimethacrylate monomer mixtures described in U.S. Pat. No. 2,976,576 and Re. Pat. No. 27,401 may be used, as well as the hydroxyalkyl methacrylates and vinyl pyrrolidone described in U.S. Pat. No. 3,503,393. Specific suitable monomer materials include 2-hydroxyethyl methacrylate, 2-hydroxypropyl acrylate, glycerol methacrylate, glycidyl methacrylate, dimethylaminoethyl methacrylate, acrylic acid, methacrylic acid, collagen, acrylamide, diacetone acrylamide, and the like. Included also are monomeric materials resulting in polymers such as tefilcon, phemfilcon, hefilcon A, hefilcon B, perfilcon A, lidofilcon B, tetrafilcon A, droxifilcon A, ocufilcon B, Bufilcon A, crofilcon A, deltafilcon A, netrafilcon A, and etafilcon A. These are United States approved drug names (USAN).

The lens forming monomer may also be selected from the type used to produce rigid lenses, particularly gas permeable rigid lenses. Examples include hydrophobic acrylic-type polymers such as polymethyl methacrylate. The lens forming monomer may also be selected from elastomeric materials such as polysiloxane.

As the next step, polymerization of the monomer liquid is initiated and completed under appropriate known curing conditions, which include curing in an oven or the use of other techniques such as radiation, including U.V. and microwave, or the use of a bath with a heat transfer fluid, such as water and silicone oil.

Following this, the lens is dismounted from the mold and then finished in the usual fashion. In the case of soft hydrogel lenses, the finishing will include customary hydrating techniques. Finally, the lens is scrutinized by quality control procedures, and the final product is then ready for packaging and labeling.

It is a feature of the present invention that the imprinting of the pattern is carried out as an integral part of the lens forming operation. After the lens material has been poured and cured, there is no further manufacturing segment in which the lens blank must be rehandled for the purpose of applying the colorant pattern. It is a further feature that the pattern is fixedly impregnated within the lens matrix, so that the color pattern is protected against leaching and exhibits superior appearance, color retention and durability.

In a further embodiment of the invention, the procedure described above may be used to place an identifying colored dot or mark adjacent the concave surface of a soft optical lens. Soft lenses have a tendency at times to turn inside-out on themselves, and it is important, but sometimes difficult, for the user to determine whether or not this has happened. A colored dot visible on the concave surface, but not on the convex, provides a readily ascertainable identification of the appropriate surface to be applied against the eye. In accordance with the present invention, such a mark can be imprinted on the surface of the mold component for the concave side of the lens and then covered by the imprinting of subsequent coloring layers, so that in the finished lens the identifying mark can be seen prior to placing in the eye, but not thereafter. Other approaches may be visualized, such as printing a colored mark on the concave side of the lens portion covering the white of the eye, and then printing a matching white spot on the convex side of the lens, to mask the colored mark.

In a further embodiment of the invention, the procedure described above may be used to place a layer of an aqueous soluble therapeutic agent or an encapsulated aqueous soluble therapeutic agent adjacent to a surface of a soft contact lens. The system may be designed to provide for the optimum controlled and prolonged release of the therapeutic agent. Such therapeutic agents include, but are not limited to, pilocarpine, epinephrine, chromolyn sodium and idoxuridine.

The following examples describe specific embodiments which are illustrative of the invention but should not be interpreted as limiting the scope of the invention in any manner. All parts and percentages are by weight unless otherwise specified.

EXAMPLE 1

A 20% portion of polyvinyl alcohol is dissolved in an 80% portion of butanol, and to this solution 5% titanium dioxide, 0.1% phthalocyanine blue, 0.1% phthalocyanine green, and 1% iron oxide yellow pigments are dispersed by vigorously mixing in a Waring blender to such an extent that the pigment particles are uniformly dispersed to less than 10 microns in size. This dispersion is then imprinted on the surface of a convex casting mold half, using a commercially available pad transfer printing machine and a computer generated iris-like pattern etched on a steel plate using well known photo etching techniques. After allowing the solvent to evaporate, the mold parts were assembled, and a hydroxyethyl methacrylate monomer with 0.5% ethylene glycol dimethyl acrylate as cross linker and thermal initiator IPP was added to the mold. The monomer was polymerized thermally at 55 degrees C. for 8 hours. Upon decapping the mold halves a lens with a colored iris pattern was recovered. The lens was then finished through the routine processing steps and hydrated and packaged.

EXAMPLE 2

A 30% portion of polymethyl methacrylate resin was dissolved in a 50/50 solvent blend of 1-methoxy-2-propylacetate and cyclohexanone. In this solution, 5% titanium dioxide, 0.1% phthalocyanine blue, 0.1% phthalocyanine green, and 1% iron oxide yellow pigments were dispersed using a Waring blender at high speed until the dispersion was uniform and the particle size was less than 10 microns. Using a commercially available pad transfer printing machine and the etched steel plate with an iris-like pattern, the optical surfaces of both mold halves were printed with the pattern. Lenses were cast and cured under ultra violet radiation using a glycidyl methacrylate/methylmethacrylate monomer blend with ethylene glycol dimethylmethacrylate cross linker and BME as photo initiator. Upon decapping and demolding, a lens with iris patterns was recovered. The lens was then finished through the routine procedures known to the industry.

EXAMPLE 3

A 35% portion of polyvinyl chloride resin was dissolved in a 50/50 solvent blend of cyclohexanone/methyl ethyl ketone. In this solution, 7% titanium dioxide, 0.05% phthalocyanine blue and 0.5% iron oxide yellow pigments were dispersed using a Waring blender at high speed until the dispersion was uniform and the particle size was less than 10 microns. Using a commercially available pad transfer printing machine and the etched steel plate with an iris-like pattern, the optical surfaces of both mold halves were printed with the pattern. Lenses were cast and cured under ultra violet radiation using a methacryloxypropyltris(pentamethyl disiloxanyl)silane/methyl methacrylate monomer blend with ethylene glycol dimethylmethacrylate cross linker and BME as photo initiator. Upon decapping and demolding, a lens with iris patterns was recovered. The lens was then finished through the routine procedures known to the industry.

EXAMPLE 4

15% of Cellulose Acetate Butyrate was dissolved in 85% Butoxy Ethyl Acetate solvent. To this mixture 22% cobalt-chromium aluminum oxide blue, 20% yellow iron oxide pigments and 0.4% fumed silica, a thixotropic agent, by weight were added and dispersed under a high speed mixer until particles were uniformly dispersed to the desired size. Using a commercially available pad transfer printing machine and a desired etched pattern, the optical surface of the molds were printed. After allowing the solvent to evaporate, these single piece molds were filled with a monomer mixture consisting of 99% hydroxyethyl methylacrylate, 0.5% Ethylene Glycol Dimethacrylate and 0.5% Trimethylpentyl-2-peroxyneodecanoate. The monomer mixture was thermally polymerized in an oven. The front curve surface of the lens was lathe cut to obtain desired refractive power. Upon removing from the mold, lenses with desired pattern were recovered and then finished through the routine manufacturing procedures.

What is claimed is:

1. A method of producing a soft hydrogel colored contact lens comprising:
    preparing a dispersion by:
        dissolving in an organic solvent from 1 to 90% by weight of a polymerized thermoplastic material in the solvent which material is compatible with the monomer material to be used in the lens so as to produce a resin system of the thermoplastic material in the organic solvent,
        dispersing in the resulting resin system from about 1 to about 80% by weight of the resin system of a coloring material which is insoluble in the monomer material to be used to form the lens so as to form a dispersion, and
        incorporating in said dispersion an amount of a thixotropic agent sufficient to prevent the dispersion from running when applied on the surface of the mold,
    applying the resulting dispersion produced above to imprint an iris simulating pattern on a surface of a casting mold,
    evaporating the organic solvent from the dispersion,
    introducing a monomeric lens forming liquid in said mold in contact with said imprinted surface wherein said monomer lens forming liquid comprises a hydrophilic monomer capable of forming a soft hydrogel lens,
    polymerizing said liquid to produce a lens blank having a colored pattern impregnated in said blank, adjacent an optical surface thereof and
    hydrating the resulting lens.

2. The method of claim 1 in which the monomer is a hydroxy ethyl methylacrylate.

3. The method of claim 1 in which the monomer is a glycidyl methacrylate/methyl methacrylate monomer blend.

4. The method of claim 1 in which the resin system comprises polyvinyl alcohol dissolved in butanol.

5. The method of claim 1 in which the resin system comprises polyvinyl chloride dissolved in a methyl ethyl ketone.

6. The method of claim 1 in which the resin system comprises polymethyl methacrylate dissolved in a blend of 1-methoxy-2-propylacetate and cyclohexanone.

7. The method of claim 1 in which the coloring material is titanium dioxide.

8. The method of claim 1 in which the coloring material is phthalocyanine blue.

9. The method of claim 1 in which the coloring material is phthalocyanine green.

10. The method of claim 1 in which the coloring material is a mixture of titanium dioxide, phthalocyanine blue and phthalocyanine green.

* * * * *